No. 702,463. Patented June 17, 1902.
N. NILSON.
AUTOMATIC WEIGHING SCALE.
(Application filed Mar. 11, 1901.)
(No Model.) 4 Sheets—Sheet 1.
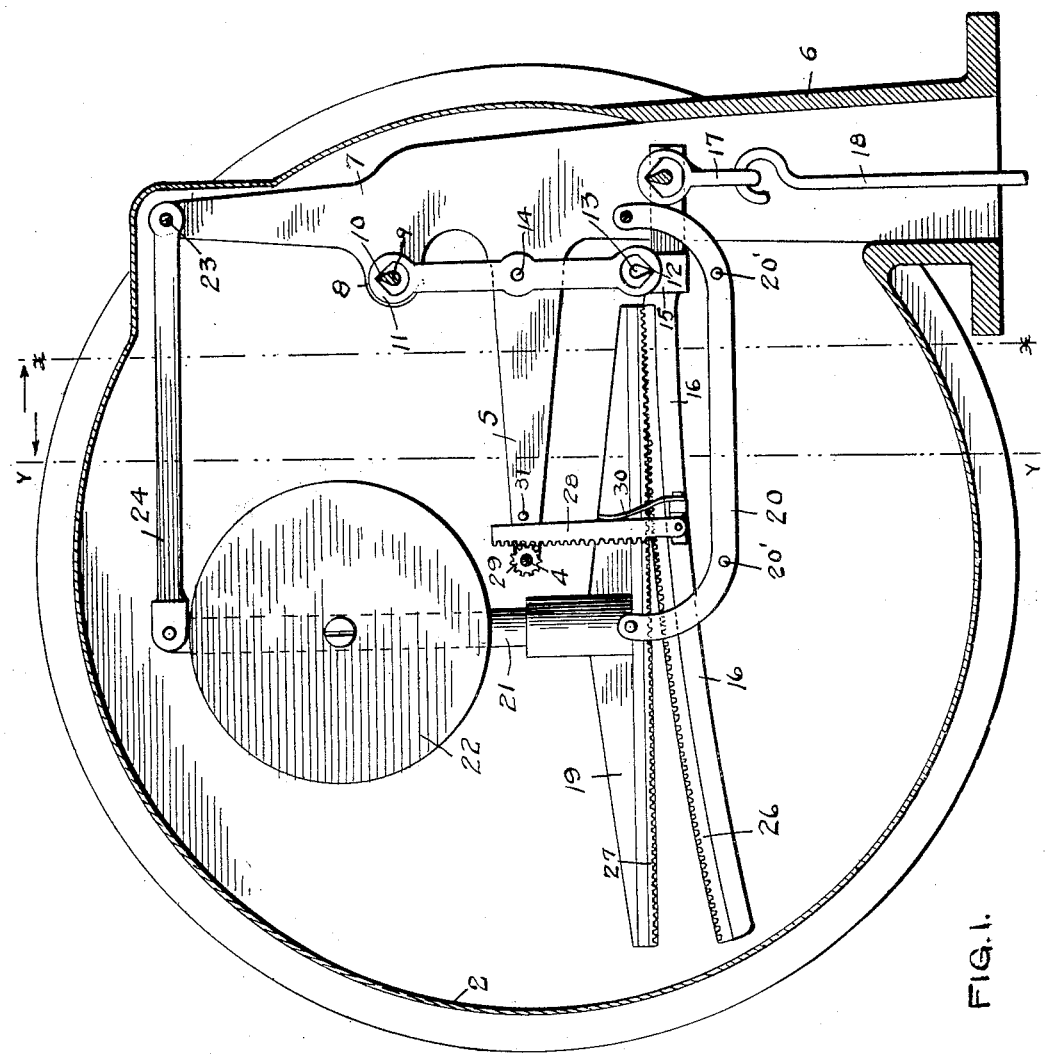
FIG. I.
WITNESSES
E. G. Staude
M. C. Noonan.
INVENTOR
NILS NILSON
BY Paul O. Henaly
HIS ATTORNEYS No. 702,463. Patented June 17, 1902.
N. NILSON.
AUTOMATIC WEIGHING SCALE.
(Application filed Mar. 11, 1901.)

(No Model.) 4 Sheets—Sheet 2.

WITNESSES
E. G. Staude
M. C. Noonan

INVENTOR
NILS NILSON
BY Paul Hawley
HIS ATTORNEYS

No. 702,463. Patented June 17, 1902.
N. NILSON.
AUTOMATIC WEIGHING SCALE.
(Application filed Mar. 11, 1901.)
(No Model.) 4 Sheets—Sheet 3.
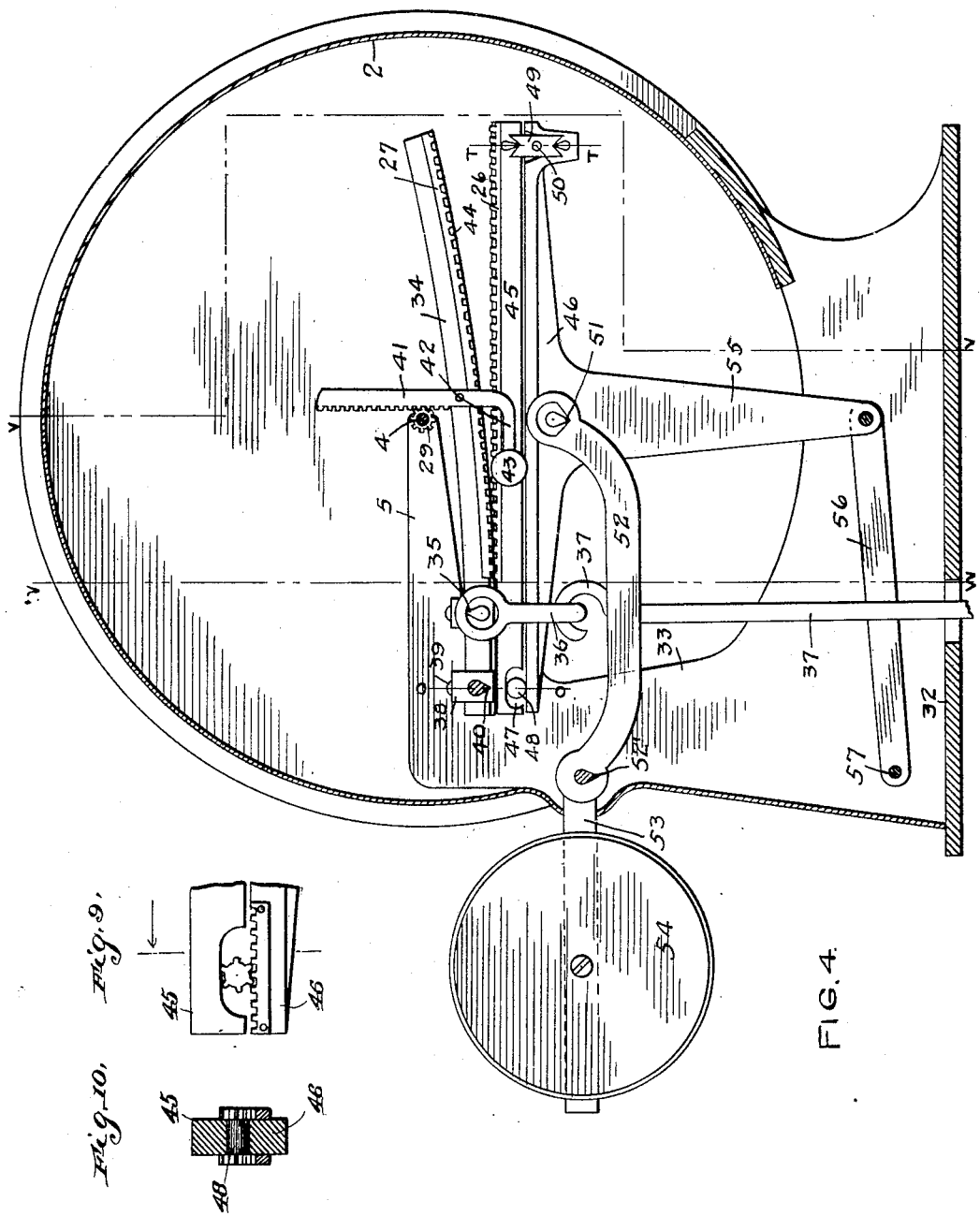
WITNESSES
INVENTOR
NILS NILSON
BY
HIS ATTORNEYS No. 702,463. Patented June 17, 1902.
N. NILSON.
AUTOMATIC WEIGHING SCALE.
(Application filed Mar. 11, 1901.)
(No Model.) 4 Sheets—Sheet 4.
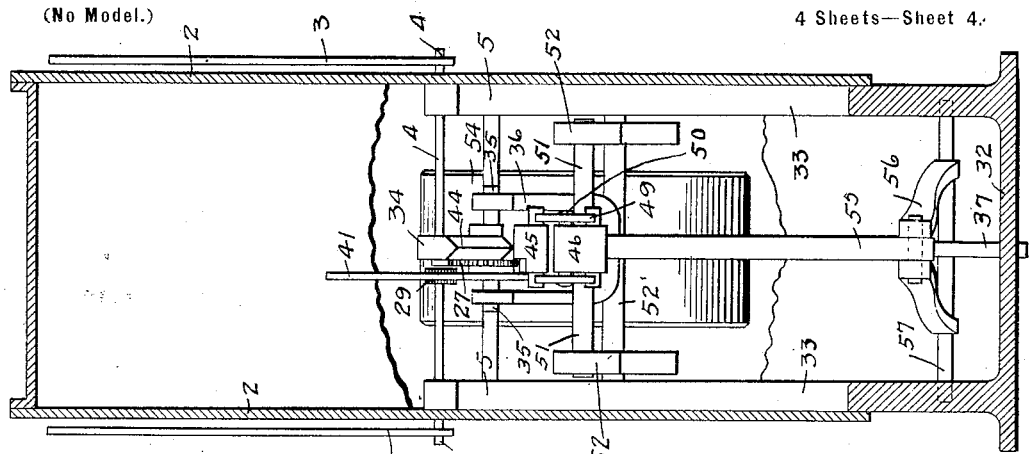
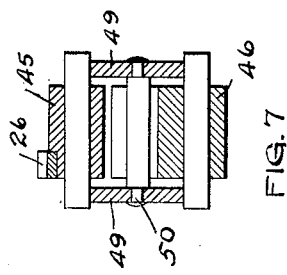
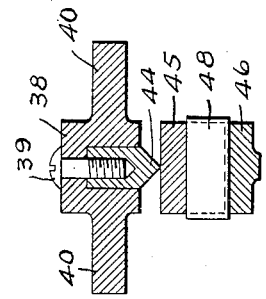
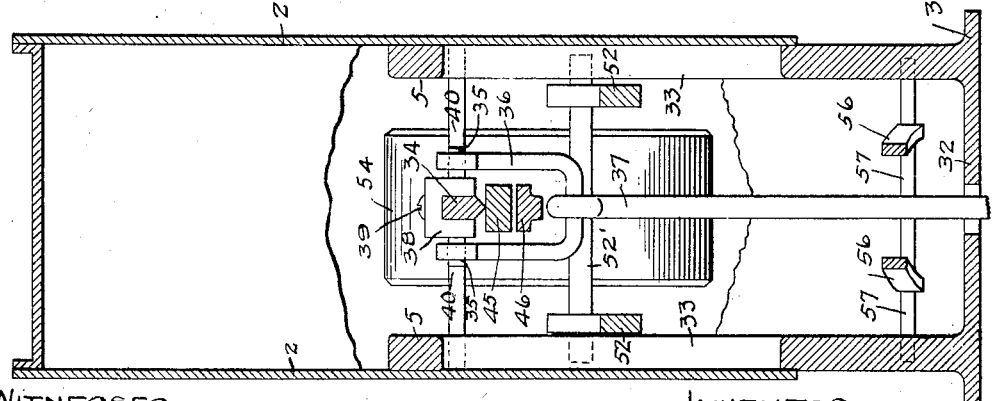
WITNESSES
E. G. Staude
M. C. Noonan
INVENTOR.
NILS NILSON
BY Paul O. Hawley
HIS ATTORNEYS

UNITED STATES PATENT OFFICE.

NILS NILSON, OF WAYZATA, MINNESOTA.

AUTOMATIC WEIGHING-SCALE.

SPECIFICATION forming part of Letters Patent No. 702,463, dated June 17, 1902.

Application filed March 11, 1901. Serial No. 50,579. (No model.)

*To all whom it may concern:*

Be it known that I, NILS NILSON, of Wayzata, Hennepin county, Minnesota, have invented certain new and useful Improvements in Automatic Weighing-Scales, of which the following is a specification.

My invention relates to weighing-scales of the rocker type, and is designed as an improvement over the scale shown and described in Letters Patent of the United States No. 643,423, issued to me February 13, 1900.

The object of the invention is to provide a scale having opposing or contacting members, the leverage and the consequent stroke or travel of the lever member being substantially the same at all points, to the end that the movement of the indicator may be regular and the graduations of the dial equally spaced.

Other objects will appear from the following detailed description.

The invention consists, generally, in providing opposing or contacting scale members having their pivots or fulcrums at corresponding ends.

Further, the invention consists in mounting the balance-weight at or near the center of its bar, so that the weight will be exerted centrally thereon and the friction evenly distributed on the pivots.

Further, the invention consists in various constructions and combinations, all as hereinafter described, and particularly pointed out in the claims.

Figure 3:
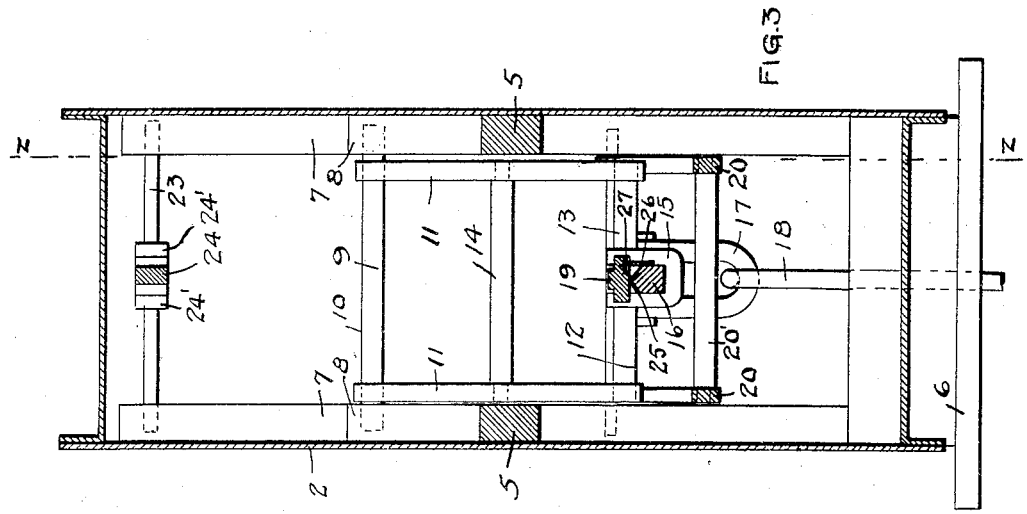
Figure 2:
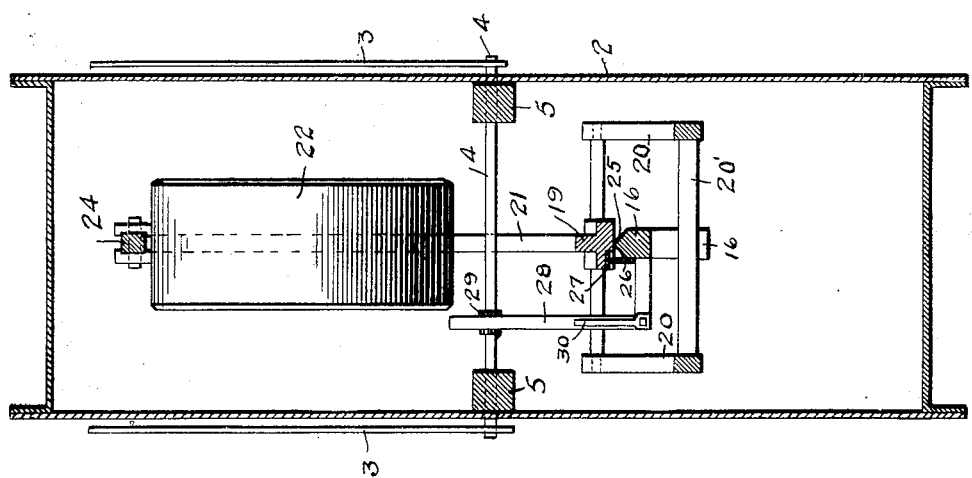

In the accompanying drawings, forming part of this specification, Figure 1 is a vertical section of my improved scale on the line $z\ z$ of Fig. 3. Fig. 2 is a section on the line $y\ y$ of Fig. 1. Fig. 3 is a section on the line $x\ x$ of Fig. 1. Fig. 4 is a section similar to Fig. 1, showing a slightly-modified construction. Fig. 5 is a vertical section on the line $w\ w$ of Fig. 4. Fig. 6 is a similar view on the line $v\ v$ of Fig. 4. Fig. 7 is a section on the line $t\ t$ of Fig. 4. Fig. 8 is a section on the line $o\ o$ of Fig. 4. Figs. 9 and 10 are details of the rack-and-pinion-controlling device for the antifriction-roller shown in Fig. 4.

I have shown a platform style of scale; but the mechanism is equally applicable for use with a hopper-scale or any other type.

In the drawings, 2 represents a suitable casing inclosing the working parts of the scale.

3 represents pointers or indicator-hands mounted on a spindle 4 and adapted to move over suitably-graduated dials provided on the casing. The spindle 4 is supported in horizontal arms 5, provided on standards 6 6, that support the working parts of the scale and between which said parts are arranged.

7 7 are upwardly-extending arms forming continuations of the standards 6 6 and having lugs 8, supporting a pivot 9, having knife-edges 10 for links 11, whose lower ends are provided with bearings for knife-edges 12 of a pivot 13. The links are connected at an intermediate point by a rod 14. The pivot 13 carries a loop 15, wherein a lever or beam 16, having a free longitudinal movement with respect to its supports, is hung, its short arm being provided with a link 17, connected to a rod 18, through which the movement of the working parts of the scale is communicated to the platform and its levers.

19 is a horizontal bar having a plane or flat face opposing or contacting the lever 16 and centrally pivoted on a link or yoke 20, that is in turn pivoted in the standards 6. The sides of the yoke are connected by the rods or bolts 20'. The bar 19 is provided with a rod or standard 21, carrying a balance-weight 22, and said rod is pivotally connected by a link 24 with a pivot 23, provided between the arms 7. Collars 24', fitting snugly on the pivot 23, prevent lateral slipping or sliding of the bar 24. The supports of the bar 19 permit a swinging substantially vertical movement, but prevent independent longitudinal movement thereof. The lever 16 has a curved upper surface forming a rocker and is provided with a V-edge 25, adapted to bear on the flat face of the bar 19. The V and plane surfaces may be reversed, if preferred.

Rack-bars 26 and 27, corresponding to those described with reference to my former patent, are provided on the lever 16 and bar 19 to prevent any sliding or slipping of one part upon the other and consequent inaccuracy of the scale. The lever and its opposing or contacting bar being fulcrumed at corresponding ends will in swinging on their pivots describe arcs whose curves are in the same direction, so that the variation of the lever and bar in their travel on either side of a line perpendicular to the plane face of the bar will be reduced to a minimum. This manner of arranging the lever 16 will cause its leverage to be proportional at all times to the variation of the load on the scale, so that the movement of the indicator over the dial will be regular and uniform spacing of the graduations on the dial will be permitted. This manner of pivoting the lever and its opposing member is a very important feature of my invention, for I have found that where these parts were fulcrumed at opposite ends, as in my former patent, each in its path or travel would describe an arc oppositely curved to that of the other, and after passing a fixed point their divergence would become very marked, and as the leverage of the scale lever or member increased the indicator would travel a shorter distance to indicate a certain unit of weight, and the graduations would therefore necessarily be more closely arranged on the dial as the weight represented by them increased. I have also found it preferable to support the balance weight or poise centrally on its supporting-bar in order that the friction on the pivots supporting the weight and bar may be evenly distributed throughout the travel of these parts.

To operate the indicator, I provide a rack-bar 28, pivoted on the rocker-lever 16 and adapted to engage a pinion 29 on the spindle 4 and normally held in engagement therewith by a spring 30. A pin 31 limits the backward movement of said bar.

In Fig. 4 I have shown a modification in the construction of the scale which consists in substantially reversing the arrangement of the working mechanism. In the modified construction, 32 represents the base and 33 upright standards between which the working parts are arranged, as in the preferred construction. 34 is the rocker-lever, having knife-edges 35 for the link 36, to which the platform-lever rod 37 is attached. 38 is a block secured on the lever 34 by a screw 39 and having knife-edges 40, whereon the lever 34 is pivoted in the standards 33. A rack-bar 41, pivoted on the lever 34, is provided with an arm 42, carrying a weight 43, normally holding said bar in engagement with the spindle-pinion 29, as heretofore described with reference to Fig. 1. The lever 34 has a V-edge 44, resting upon a plane-surfaced bar that is in turn supported on the head of a T-bar 46. The bar 45 has, preferably, a longitudinal movement on its support, and I have shown it provided at one end with a slot 47, wherein an antifriction-roller 48 is loosely arranged and adapted to bear on said bar 46. A similar bearing may be provided for said bar 45 at its opposite end, but I have shown plates 49 connected centrally by a pin 50 and having V-shaped recesses in their ends to receive knife-edges on the bars 45 and 46. The links or plates last described may be provided at both ends of the bar, if preferred. The bar 46 is provided with knife-edges 51, centrally arranged thereon and having bearings in the ends of a yoke 52, that is fulcrumed on knife-edges 52' at its opposite end in said standards and is provided with an arm 53, whereon a balance-weight 54 is mounted. A depending extension 55 of the T-bar 46 is pivotally connected at its lower end with a link 56, that is in turn pivoted in said base on a rod 57.

The link 24 (see Fig. 1) serves to steady the rod 21 and the balance-weight carried thereby and renders the movement of the bar 19 uniform and stable at all points. The centers of the pivots on the link 24 are the same distance apart as the pivotal centers of the yoke 20, and the corresponding ends of said link and said yoke are also equal distances apart, and hence the bar 19 will describe a true arc in its vertical movement, and the balance-weight will at all points stand in a substantially vertical position. I consider this manner of supporting the bar 19 as an important feature of my invention, as it permits vertical movement of said bar and causes it at all points of its travel to present its plane or flat face horizontally with respect to the face of its opposing or contacting lever.

I am thus able to provide a more delicate adjustment, avoid binding of the scale mechanism, eliminate unnecessary friction, prevent variation of the leverage, and insure a reliable accurate action of the scale. The construction shown in Fig. 4 is substantially the same except that the position of the lever and bar is reversed and the balance-weight is applied upon the ends of the yoke, through which it is transmitted to the center of its bar instead of being supported directly upon the lever itself. To regulate the travel of the roller 48, I may employ a rack or pinion device in connection therewith, such as is shown in Figs. 9 and 10, wherein 46' represents the pinions provided upon each end of the roller 48, and 46'' represents rack-bars secured to the bar 46 and having their teeth in engagement with said pinions. This device will serve to control the movement of the roller, preventing it from twisting in the slot and causing it to travel in a plane substantially at right angles to the bar 46.

Instead of employing the single link 24, as shown in Fig. 3, I may adopt a forked or yoke connection similar to the part 56, (illustrated in Fig. 6,) and in various other ways the details of construction may be modified without departing from my invention.

Having thus described my invention, I claim as new and desire to secure by Letters Patent—

1. In an automatic scale, engaging members rocking one upon the other and each having movable pivots one near the end of one member and the other centrally disposed with respect to the contacting surface of the other member.

2. In an automatic scale, the combination, with opposing contacting members rocking one upon the other, of relatively movable pivots therefor provided one near the end of one member and the other centrally disposed with respect to the contacting surface of the other member, and means for preventing the longitudinal movement of one member with respect to the other.

3. In an automatic scale, the combination, with opposing members acting one upon the other each having movable pivots one near the end of one member and the other centrally disposed with respect to the contacting surface of the other member, of platform and scale connections for one of said members, substantially as described.

4. In an automatic scale, opposing contacting members having respectively plane and curved faces and rocking one upon the other, the pivots of said members being located respectively near the end of one member and centrally arranged with respect to the other and said members having respectively a longitudinal and a vertical oscillating movement, substantially as described.

5. In an automatic scale, the combination, with an opposing contact-lever and a bar rocking one upon the other and having relatively movable pivots located respectively near the end of one and the center of the other, of an indicator a dial, and operative connections provided between said lever and said indicator, for the purpose specified.

6. In an automatic scale, an opposing or contacting lever and a bar having respectively curved and plane faces and rocking one upon the other, said lever and bar having respectively a longitudinally and vertically swinging movement, and a balance-weight adapted to exert its force centrally with respect to said bar.

7. In an automatic scale, a rocking lever 16 and links 11 whereon said lever is suspended, in combination, with a bar 19 engaging said lever 16, a yoke 20, and a link 24, the pivots of said yoke and link being equally spaced.

8. In an automatic scale, the combination, with a rocker-lever 16 and links 11, of a bar 19 contacting with said lever 16, a yoke 20 and a link 24 whereon said bar 19 is centrally pivoted, and a balance-weight centrally supported on said bar 19, substantially as described.

9. In an automatic scale, the combination with standards 6, of an opposing lever 16 and bar 19, links 11 and 24 and a yoke 20 pivoted in said standards and whereon said lever and bar are pivoted respectively, an indicator-hand, a dial, and operative connections provided between said lever 16 and said indicator-hand.

10. In an automatic scale, the combination, with a support, of an opposing or contacting lever and a bar rocking one upon the other, pivoted connections 20 and 24 provided between said support and said bar, the centers of said pivoted connections being a corresponding distance apart whereby said bar will describe a true arc in its vertical movement, and a weight carried by said bar between said pivoted connections, substantially as described.

11. The combination, with the standards 6, of an opposing contacting lever and a bar rocking upon the other, links 11 whereon said lever is supported upon said standards, a yoke 20 pivotally connecting said standards with the middle portion of said bar, a rod 21 provided on said bar, a link 24 connecting the upper portion of said rod 21 with said standards, the pivotal centers of said link 24 and said yoke being an equal distance apart, and a balance-weight carried by said rod 21, substantially as described.

12. In an automatic scale, opposing members rocking one upon the other each having movable pivots arranged one near the end of one member and the other near the center of the contacting surface of the other member, and a balance-weight centrally supported upon one of said members, substantially as described.

13. In an automatic scale, the combination, with a lever and a bar pivoted one near its end and the other near its center and having a rocking contact one upon the other, link members having their pivots equally spaced and whereon said bar has a substantially vertical oscillating movement, and a balance-weight centrally supported on said bar between said link members.

14. In an automatic scale, a rocking lever and its pivots, in combination, with an oscillating member opposing said lever, a support, guiding means pivotally connecting said support and said member, the pivots of said guiding means at one end thereof being equally spaced from the corresponding pivots at the other end, for the purpose specified.

15. In an automatic scale, a rocking lever and its pivots, in combination, with an oscillating member opposing said lever, a support, guiding means pivotally connecting said support and said member, the pivots of said guiding means at one end thereof being equally spaced from the corresponding pivots at the other end, and a balance-weight supported by said member, substantially as described.

16. In an automatic scale, a rocking lever and an oscillating member opposed thereto, a support, guiding means pivotally connecting said support and said member, the pivots of said guiding means on said support and the pivot of said lever being at corresponding ends of said means and said lever, and the pivots of said guiding means at one end of said member being equally spaced from the opposite corresponding pivots, substantially as described.

17. In an automatic scale, a standard or support, in combination with a rocking lever suspended thereon, a bar opposing said lever and whereon said lever rocks, and guiding devices pivoted on said support and between which said bar is suspended, substantially as described.

18. In an automatic scale, a suitable standard or support, in combination, with a rocking lever suspended thereon, a member opposing and contacting with said lever, a balance-weight carried by said member, and guiding devices pivoted on said support and between which said member is suspended, said guiding devices being at the end of said member adjacent to the suspended end of said lever, substantially as described.

In witness whereof I have hereunto set my hand this 7th day of March, 1901.

NILS NILSON.

In presence of—
RICHARD PAUL,
M. C. NOONAN.